United States Patent
Jiang et al.

(10) Patent No.: US 8,544,418 B2
(45) Date of Patent: Oct. 1, 2013

(54) INTELLIGENT DOGHOUSE

(75) Inventors: Wei Jiang, Guangdong (CN); Hailong Qin, Guangdong (CN)

(73) Assignee: Hong Kong Tesla Technology Limited, Hong Kong (HK)

( * ) Notice: Subject to any disclaimer, the term of this patent is extended or adjusted under 35 U.S.C. 154(b) by 224 days.

(21) Appl. No.: 13/109,244

(22) Filed: May 17, 2011

(65) Prior Publication Data

US 2012/0291715 A1  Nov. 22, 2012

(51) Int. Cl.
*A01K 5/02* (2006.01)
*A01K 7/02* (2006.01)
*A01K 39/012* (2006.01)
*A01K 5/00* (2006.01)

(52) U.S. Cl.
USPC ........... 119/476; 119/482; 119/500; 119/493; 119/416; 119/421; 119/448; 119/432; 119/496; 119/479; 119/72; 119/161; 119/51.11; 119/51.12; 119/457; 119/51.01; 119/57.92

(58) Field of Classification Search
USPC ................. 119/476, 482, 500, 493, 416–418, 119/421, 448, 452, 496, 479, 61.5, 51.11, 119/51.12, 51.15, 454, 456, 457, 458, 51.01, 119/51.04, 52.1, 56.2, 57.1, 57.2, 57.7, 57.92, 119/161, 162, 163, 165, 602–605, 606, 668, 119/669, 667, 677, 672, 72, 74
See application file for complete search history.

(56) References Cited

U.S. PATENT DOCUMENTS

| | | | | |
|---|---|---|---|---|
| 1,422,953 A * | 7/1922 | Frank | | 4/322 |
| 2,626,387 A * | 1/1953 | Berry | | 340/573.1 |
| 3,713,177 A * | 1/1973 | Tufts et al. | | 4/320 |
| 3,771,491 A * | 11/1973 | Hunter | | 119/163 |
| 4,008,689 A * | 2/1977 | Albers | | 119/450 |
| 4,242,765 A * | 1/1981 | Russell | | 4/321 |
| 4,517,921 A * | 5/1985 | Haythornthwaite | | 119/448 |
| 4,660,506 A * | 4/1987 | Nalven | | 119/163 |
| 4,782,790 A * | 11/1988 | Batson | | 119/51.11 |
| 5,168,829 A * | 12/1992 | Dietrich | | 119/481 |
| 5,299,529 A * | 4/1994 | Ramirez | | 119/51.11 |
| 5,433,171 A * | 7/1995 | Ewell | | 119/51.5 |
| 5,494,001 A * | 2/1996 | Leibowitz | | 119/163 |
| 5,698,095 A * | 12/1997 | Kami | | 210/173 |
| 6,138,609 A * | 10/2000 | Gordon | | 119/166 |
| 6,367,417 B1 * | 4/2002 | Gal et al. | | 119/51.5 |
| 6,412,121 B2 * | 7/2002 | Motoyama | | 4/318 |
| 6,651,592 B2 * | 11/2003 | Maddox et al. | | 119/720 |
| 7,011,044 B2 * | 3/2006 | Segura Jobal | | 119/671 |
| 8,127,718 B2 * | 3/2012 | Hoegh et al. | | 119/481 |
| 8,291,866 B2 * | 10/2012 | Cauchy et al. | | 119/500 |
| 2006/0011144 A1 * | 1/2006 | Kates | | 119/719 |

(Continued)

*Primary Examiner* — Andrea Valenti (57) ABSTRACT

An intelligent doghouse full-automatic processor includes a cage bracket module, and an automatic excrement treating device, a feeding module, a water feeding module, a snack feeding module, a disinfection and heat preservation device and a video/audio module which are arranged on the cage bracket module as well as an automatic door control module, a host computer control module, a network communication module, a background control service module, a terminal use program and the like. With the modules, an owner can remotely monitor an intelligent doghouse, perform video/audio conversation with a pet dog and control and manage the eating and drinking, defecation and entering and exiting cage of the pet dog, disinfection of the cage and temperature regulation of air inside the cage by a computer or a mobile phone through a network browser. Moreover, parameters of the intelligent doghouse can be set through network.

9 Claims, 5 Drawing Sheets

(56) References Cited

U.S. PATENT DOCUMENTS

| | | | |
|---|---|---|---|
| 2006/0011145 A1* | 1/2006 | Kates | 119/719 |
| 2006/0011146 A1* | 1/2006 | Kates | 119/719 |
| 2006/0196445 A1* | 9/2006 | Kates | 119/719 |
| 2006/0196446 A1* | 9/2006 | Kates | 119/719 |
| 2006/0201433 A1* | 9/2006 | Kates | 119/51.02 |
| 2006/0201436 A1* | 9/2006 | Kates | 119/72 |
| 2006/0219187 A1* | 10/2006 | Krishnamurthy | 119/719 |
| 2007/0137586 A1* | 6/2007 | Park | 119/57.1 |
| 2008/0036594 A1* | 2/2008 | Kates | 340/541 |
| 2008/0178817 A1* | 7/2008 | Brewer | 119/163 |
| 2008/0216765 A1* | 9/2008 | Kates | 119/712 |
| 2008/0223300 A1* | 9/2008 | Kates | 119/72 |
| 2008/0245309 A1* | 10/2008 | Markley | 119/161 |
| 2008/0314335 A1* | 12/2008 | Kates | 119/720 |
| 2009/0031966 A1* | 2/2009 | Kates | 119/719 |
| 2009/0145365 A1* | 6/2009 | Mahle et al. | 119/51.01 |
| 2009/0255477 A1* | 10/2009 | Fournier et al. | 119/161 |
| 2010/0122662 A1* | 5/2010 | Kennington | 119/165 |
| 2011/0017316 A1* | 1/2011 | Kelly et al. | 137/215 |
| 2011/0283949 A1* | 11/2011 | Kelly | 119/161 |
| 2012/0312246 A1* | 12/2012 | Doumas | 119/606 |

* cited by examiner

Fig.7

INTELLIGENT DOGHOUSE

FIELD OF THE INVENTION

The invention relates to a full-automatic treatment for dog keeping, and belongs to the field of pet articles and particularly relates to a treatment device capable of comprehensively and intelligently looking after the daily life of the pet dog, such as dog feeding, excrement clearing, disinfection, entrance and exit control, remote monitoring and communication.

BACKGROUND OF THE INVENTION

Intimacy between dogs and human beings has been in existence for thousands of years, but household dog keeping is not automated or intelligentized. For residents living in crowded cities, treatment of dog excrement is always one of the most important causes which restrict dog keeping or reduce dog keeping enjoyment. Most current town houses are delivered after decoration and most bathrooms are provided with close stools instead of squatting pans in advance, so that excrement of pet dog is particularly inconvenient to treat. On the other hand, full-automatic pet dog keeping cannot be realized if automatic discharge and clearing of excrement cannot be solved, so that care of a pet in a house becomes a problem once the owner goes out. Along with the increasing number of pet dog keeping people, care of pets left alone in the houses become a larger and larger problem once owners go out. For the public, more and more dogs stroll in cities and defecate randomly, which affects the appearance of cities. Therefore, people look forward to adding certain toilets special for dogs in cities on the premise of not changing the current blow-off lines in the cities.

SUMMARY OF THE INVENTION

As to the problem, the invention aims at providing a full-automatic intelligent doghouse for keeping a pet dog in a household. Of course, the intelligent doghouse can also be taken as a public toilet for dogs in cities.

In order to fulfill the technical aim, the scheme of the invention is that: an intelligent doghouse comprises a cage bracket module, and a host computer control device, an automatic excrement treating device, a feeding module, a disinfection and heat preservation device, an automatic door control module and a video/audio module which are arranged on the cage bracket module, wherein the host computer control device comprises a host computer control module which translates and executes various commands through a singlechip circuit;

the automatic excrement treating device comprises a defecation guiding module for attracting a pet to defecate at a fixed position, a stirring module for receiving water and excrement and smashing the excrement, an excrement flushing module for flushing the excrement and injecting water into the stirring module, a water level and weight measuring module for supplying measuring information to the control of water intake and drainage actions and the stirring action of the stirring module, a sewage discharge mechanism for discharging sewage treated by the stirring module, and a central control module for receiving the information of the water level and weight measuring module and controlling the actions of a stirring motor and the sewage discharge mechanism;

the feeding device is provided with a feeding program stored in the host computer module and used for automatically executing feeding action, and can also feed food, snacks or drinking water under remote control;

the disinfection and heat preservation device is provided with a refrigerating module capable of controlling the temperature of the doghouse in an appropriate state, a heating module capable of supplying hot air for drying the dog after bath and a disinfection module used for disinfecting and deodorizing the dog cage;

the automatic door control module controls the opening and closing of a pet door in an electromagnetic way;

the video/audio module comprises an infrared camera capable of shooting the pet, a broadband microphone and a loudspeaker;

the automatic excrement treating device, the feeding device, the disinfection and heat preservation device and the automatic door control module are connected with the host computer control module; the host computer control module can be connected with value-added service background equipment for automatic control and can automatically control daily operation of each device locally. A user can remotely access the value-added service background equipment so as to control each terminal device through the host computer control module.

Preferably, the feeding module comprises a feeding container and a feeding bowl; a container liner with an upper food leakage hole at the bottom end is arranged in the feeding container; the feeding bowl is connected to a lower food leakage hole formed at the bottom of the feeding container through a pipeline; a food conveyer driven by a stepper motor is arranged between the upper and lower food leakage holes and conveys food from the upper food leakage hole to the lower food leakage hole till the feeding bowl; and the rotation angle of the stepper is controlled by the host computer control module.

Preferably, the snack feeding module comprises a snack feeding container and a snack feeding bowl; a snack liner with an upper snack leakage hole at the bottom end is arranged in the snack feeding container; the snack feeding bowl is connected to a lower snack leakage hole formed at the bottom of the snack feeding container through a pipeline; a snack conveyer driven by a snack stepper motor is arranged between the upper and lower snack leakage holes and conveys snacks from the upper snack leakage hole to the lower snack leakage hole till the snack feeding bowl; and the rotation angle of the stepper is controlled by the host computer control module.

Preferably, the water feeding module comprises a water feeding container and a water feeding bowl; a water receiving liner with an upper water leakage hole at the bottom end is arranged in the water feeding container; the water feeding bowl is connected to a lower water leakage hole formed at the bottom of the water feeding container through a pipeline; and an electric water valve is arranged between the upper and lower water leakage holes.

Preferably, the automatic excrement treating device also comprises an anti-leakage module which is used for preventing sewage from overflowing from the stiffing module and is arranged on the stirring module; the defecation guiding module consists of an annular defecation guiding apparatus and a defecation guiding liquid tank; the defecation guiding apparatus transfers defecation guiding liquid stored in the defecation guiding liquid tank to the defecation guiding apparatus through a defecation guiding apparatus cotton core and disperses the defecation guiding liquid into the air; and the defecation guiding apparatus is arranged between a bearing panel and an excrement flushing funnel.

Preferably, the stirring module of the automatic excrement treating device comprises a stirring bucket and a stirring motor; the stirring bucket is used for receiving water and excrement; a duckbill which receives excrement and makes the excrement fall into the stirring bucket projects from the open end of the stirring bucket; and the stirring motor is provided with a stirring blade for smashing excrement and is fixedly clamped at the upper open end of the stirring bucket.

Preferably, the water level detection module of the automatic excrement treating device is arranged on the inner baffle wall of the stirring bucket, acquires water level information to control water intake and drainage actions and comprises a preserved water contact for ensuring that water is preserved in the stirring bucket; a gravity detection module comprises a gravity sensor which is connected with the stirring bucket through a pair of handles symmetrically arranged on the outer wall of the stirring bucket; and a damping spring is arranged at the joint between the handle and the sensor.

Preferably, the sewage discharge mechanism of the automatic excrement treating device is arranged at the bucket bottom of the stirring bucket and is related with a drainage cover at the bucket bottom; the mechanism comprises a drainage cover jacking device, a sewage drain pipe and a flushing water pipe; an anti-reflux one-way valve is arranged between the two water pipes; and the flushing water pipe is controllably related with the water level detection module.

Preferably, the heating module of the automatic excrement treating device comprises a built-in heating rod and a blast mechanism; the disinfection module comprises a built-in disinfection pipe; the heating and disinfection modules are provided with air inlets and air outlets; and air blasted by a blast blower is blown towards the doghouse through the heating and disinfection modules.

Preferably, remotely-controllable lamplight illuminating devices are arranged inside and at the bottom of the cage bracket module.

The intelligent doghouse in the scheme can judge whether the pet is defecating or not according to the changes of water level and gravity. Excrement is smashed by vortex water current and stirring equipment, so that sewage is convenient to discharge and drainage system is flushed in an intelligent way; a fixed amount of food and water can be fed to the pet regularly or instantaneously according to user setting; opening and closing of pet door are controlled in an electromagnetic way; and hot air can be supplied to pet in winter and dog cage can be disinfected by ultraviolet rays so as to remove odor. The pet dog can be monitored, controlled and managed remotely through network. Moreover, full-automatic management of pet can be realized through setting and management of background service program.

DETAILED DESCRIPTION OF THE PREFERRED EMBODIMENT

Figure 7:
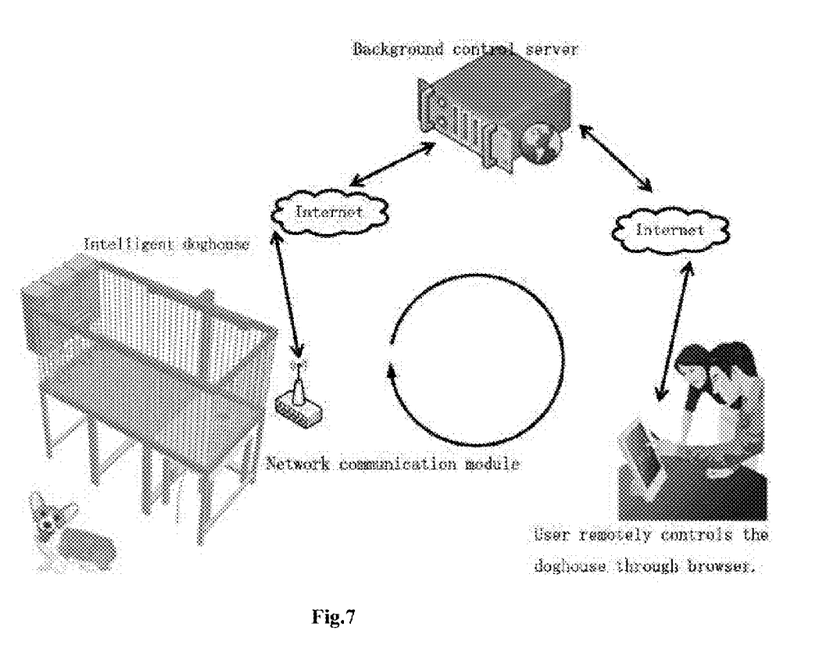
FIG. 7 is a procedure diagram of the background service module of the invention.

Further description of the invention is illustrated by combining the following attached drawings and specific embodiments:

As shown in FIG. 7, the overall structure of the intelligent doghouse of the invention comprises an intelligent doghouse in the house of a user, a network communication module on the intelligent doghouse, a remote background control server and a remote user side. When away from home, user can access the background control server through the browser by using internet surfing equipment, and the background control server acquires latest information of the intelligent doghouse and feeds the latest information back to the user, so that the user can make judgment according to the information and send a command to the background control server for controlling the action of remote intelligent doghouse.

Figure 1:
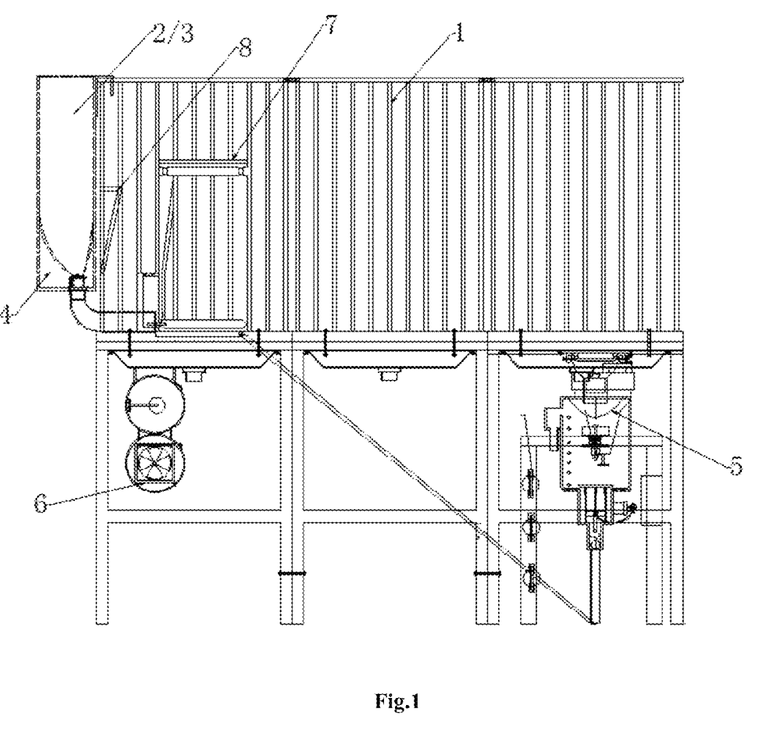
FIG. 1 is an overall structural drawing of the invention.

As shown in FIG. 1, the user can upload operation command and operation program to the host computer control module of the intelligent doghouse by operating the terminal control program, logging onto the Internet and accessing the background control service module. The network communication module plays a role in linking the intelligent doghouse with the Internet.

As shown in FIG. 1, the intelligent doghouse of the invention comprises a cage bracket module 1, and a feeding module 2, a snack feeding module 3, a water feeding module 4, an automatic excrement treating device 5, a disinfection and heat preservation device 6 and an automatic door control module 7, which are arranged on the cage bracket module 1, wherein a video/audio module, a network communication module and a network control module are also provided.

Figure 5:
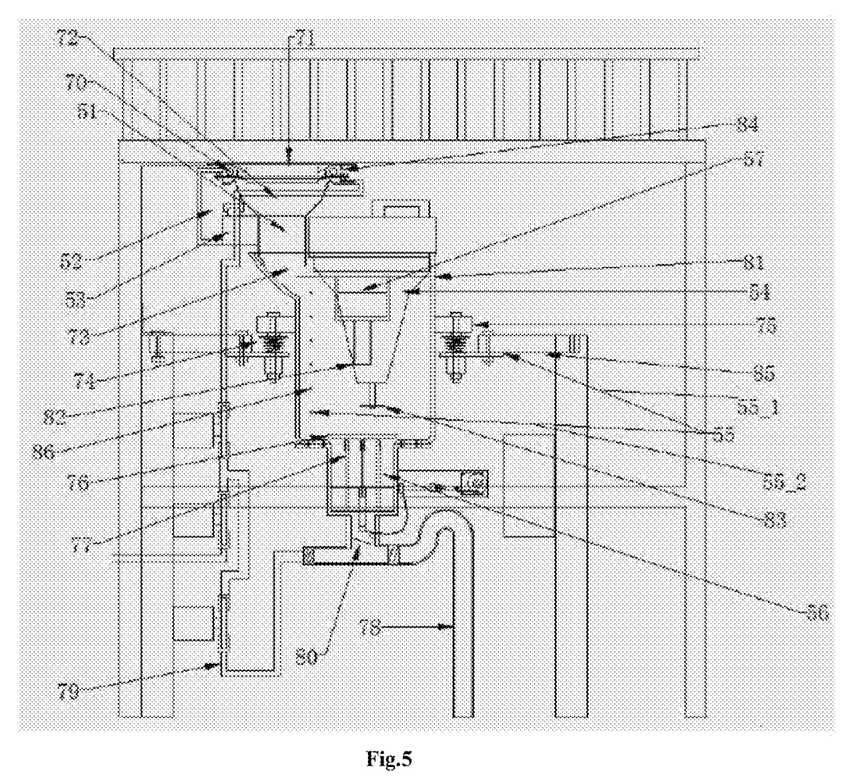
FIG. 5 is a structural schematic diagram of the automatic excrement treating device in the invention.

As shown in FIG. 5, the automatic excrement treating device 5 comprises a stirring module 54, an excrement flushing module 52, a defecation guiding tank 53, a water level and weight measuring module 55, a sewage discharge mechanism 56 and a defecation guiding module 51; an anti-overflow water outlet is formed; the defecation guiding module in the automatic excrement treating device attracts a pet to defecate at a fixed position; the stirring module receives water and excrement and smashes the excrement; the excrement flushing module flushes the excrement and injects water into the stirring module; the water level and weight measuring module supplies measuring information to the control of water intake and drainage actions and the stirring action of the stirring module; the sewage discharge mechanism discharges sewage treated by the stirring module; and an anti-overflow module prevents sewage from overflowing from the stirring module and is arranged on the stirring module. The automatic excrement treating device 5 also comprises an anti-leakage module 57 which is used for preventing sewage from overflowing from the stirring module 54 and is arranged on the stirring module 54. The defecation guiding module 51 consists of an annular defecation guiding apparatus 84 and the defecation guiding liquid tank 53. The defecation guiding apparatus 84 transfers defecation guiding liquid stored in the defecation guiding liquid tank 53 to the defecation guiding apparatus 84 through a defecation guiding apparatus cotton core 70 and disperses the defecation guiding liquid into the air. The defecation guiding apparatus 84 is arranged between a bearing panel 71 and an excrement flushing funnel 72. The stirring module 54 of the automatic excrement treating device 5 comprises a stirring bucket 81 and a stirring motor 82. The stirring bucket 81 is used for receiving water and excrement. A duckbill 73 which receives excrement and makes the excrement fall into the stirring bucket 81 projects from the open end of the stirring bucket 81. The stirring motor 82 is provided with a stirring blade 83 for smashing excrement and is fixedly clamped at the upper open end of the stirring bucket 81. The water level detection module 55_2 of the automatic excrement treating device 5 is arranged on an inner baffle wall of the stirring bucket 81, acquires water level information to control water intake and drainage actions and comprises a preserved water contact 86 for ensuring that water is preserved in the stirring bucket 81. The gravity detection module 55_1 comprises a gravity sensor 85 which is connected with the stirring bucket 81 through a pair of handles 75 symmetrically arranged on the outer wall of the stirring bucket 81; and a damping spring 74 is arranged at the joint between the handle 75 and the gravity sensor 85. The sewage discharge mechanism 56 of the automatic excrement treating device 5 is arranged at the bucket bottom of the stirring bucket 81 and is related with a drainage cover 76 at the bucket bottom. The sewage discharge mechanism 56 comprises a drainage cover jacking device 77, a sewage drain pipe 78 and a flushing water pipe 79. An anti-reflux one-way valve 80 is arranged between the two water pipes 78 and 79; and the flushing water pipe 79 is controllably related with the water level detection module 55.

Figure 6:
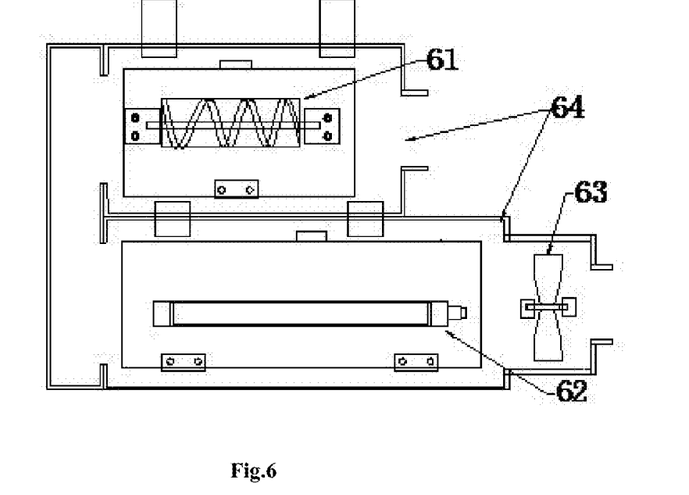
FIG. 6 is a structural schematic diagram of the disinfection and heat preservation device of the invention.

As shown in FIG. 6, the disinfection and heat preservation device 6 comprises a heating module for supplying hot air to the pet and a disinfection module for disinfecting and deoxidizing the dog cage.

The automatic door control module controls the opening and closing of the pet door in an electromagnetic way.

The automatic excrement treating device, the feeding module, the water feeding module, the snack feeding module, the disinfection and heat preservation device and the automatic door control module are controlled automatically by the host computer control module.

Figure 2:
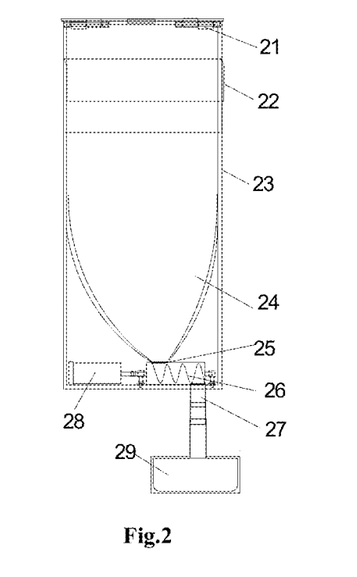
FIG. 2 is a structural schematic diagram of the feeding module in the invention.

As shown in FIG. 2, the feeding module comprises a feeding container 23 and a feeding bowl 29; a container liner 24 with an upper food leakage hole 25 at the bottom is arranged in the feeding container 23; the feeding bowl 29 is connected to a lower food leakage hole 27 formed at the bottom of the feeding container through a pipeline; a food conveyer 26 driven by a stepper motor 28 is arranged between the upper and lower food leakage holes and conveys food from the upper food leakage hole 25 to the lower food leakage hole 27 till the feeding bowl 29; and the top of the feeding container 23 is provided with a food feeder top cover 21, and the side edge of the feeding container is provided with a hook 22 which is convenient for the installation of the feeding container.

The feeding module can feed food regularly, remotely control instant food feeding, control food quantity, control in a full automatic way and feed food. During the operation, the user manually opens the feeder top cover and adds dog food into the feeder container. Specific quantity of the dog food can be determined according to the graduation standard provided in the specification, and then food is added. When the user regularly or remotely controls the startup of automatic feeding function, the stepper motor rotates by a set angle for a set period of time to drive the food conveyer to rotate, so that food is conveyed to the lower food leakage hole and falls into the feeding bowl. After the user regularly or remotely starts the automatic feeding function, the stepper motor rotates by a set angle for a set period of time to drive the food conveyer to rotate, so that food is conveyed to the lower food leakage hole and fall into the feeding bowl.

Figure 3:
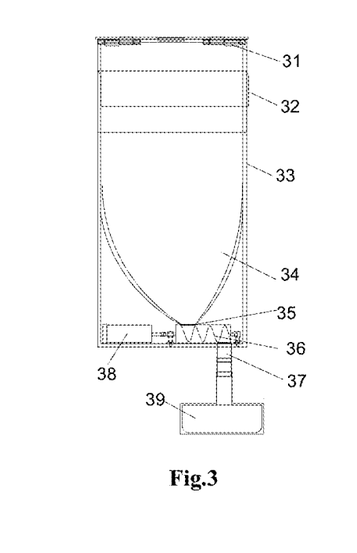
FIG. 3 is a structural schematic diagram of the snack feeding module in the invention.

Referring to FIG. 3, the snack feeding module comprises a snack feeding container 33 and a snack feeding bowl 39; a snack liner 34 with an upper snack leakage hole 35 at the bottom is arranged in the snack feeding container 33; the snack feeding bowl 39 is connected to a lower snack leakage hole 37 formed at the bottom of the snack feeding container through a pipeline; and a snack conveyer 36 driven by a snack stepper motor 38 is arranged between the upper and lower snack leakage holes and conveys snacks from the upper snack leakage hole to the lower snack leakage hole 37 till the snack feeding bowl 39. The top of the snack feeding container 33 is provided with a snack feeder top cover 31, and the side edge of the snack feeding container 33 is provided with a hook 32 which is convenient for the installation of a snack feeding container. The working principle of the snack feeding module is the same as that of the feeding module.

Figure 4:
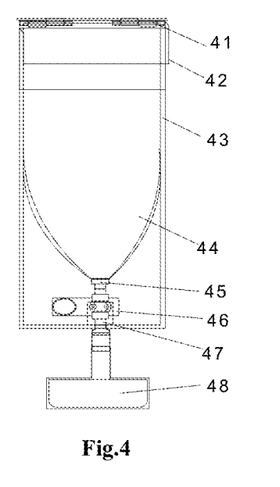
FIG. 4 is a structural schematic diagram of the water feeding module in the invention.

As shown in FIG. 4, the water feeding module comprises a water feeding container 43 and a water feeding bowl 48; a water receiving liner 44 an upper water leakage hole 45 at the bottom end is arranged in the water feeding container 43; the water feeding bowl 48 is connected to a lower water leakage hole 47 formed at the bottom of the water feeding container 43 through a pipeline; and an electric water valve 46 is arranged between the upper and lower water leakage holes. The top of the water feeding container 43 is provided with a water feeder top cover 41, and the side edge of the water feeding container 43 is provided with a hook 42 which makes the installation of a water feeder convenient.

As shown in FIG. 6, the disinfection and heat preservation device consists of a heating module, a disinfection module and a blast blower 63; the heating module comprises a built-in heating rod 61; the disinfection module comprises a built-in disinfection pipe 62; the heating and disinfection modules are provided with air inlets and air outlets 64; and air blasted by the blast blower is blown towards the doghouse through the heating and disinfection modules. After shower of the pet or in cold weather, the user can remotely or locally start the blast blower to supply air and open the heating rod, so that hot air is blown onto the body of the pet through an air supply outlet. After the pet defecates, the owner can remotely or locally start the blast blower to supply air and open the disinfection pipe, so that air entering through the air inlet is exhausted to the vicinity of the pet after being disinfected and treated.

The intelligent doghouse also comprises an owner-pet interaction module. The interaction module mainly comprises a liquid crystal screen capable of displaying the appearance of the owner or a remote dog, a camera head capable of uploading the appearance of a local dog to a server through the network, a broadband loudspeaker capable of transmitting remote barking to local place in a distortionless way and an infrared emitting device capable of illuminating the dog cage at night without affecting the resting of the dog. All the components are connected to a control mainboard, local videos and sounds can be transmitted to an online server through the screen, the camera head, etc. and the owner can access the equipment in a bidirectional way through the network. The module has the functions that: 1, the camera head can shoot video and/or images of the pet; 2, infrared illuminating is started at night, so that the pet can be shot in the absence of visible light; 3, the receiving frequency of MIC is relatively wide; and 4, the sounding frequency of the broadband loudspeaker surpasses that of human ears.

The intelligent doghouse also comprises a background control service module. As shown in FIG. 7, the background control service module consists of a background server, a client and a network. The background control server is used for offering a man-machine interaction platform. The intelligent doghouse also comprises a wireless communication module which is used for remotely controlling the doghouse and consists of a wireless emitter and a wireless receiver.

After observing the status of the pet through the browser, the user sends a command to the feeding program stored in the host computer module of the background feeding device through the network by using the terminal use service. The device can also feed food, snacks or drinking water under remote control. The control server and the background control server upload the command to the host computer control module so as to realize specific operation.

What is described above is only preferred embodiment of the invention, and is not used for limiting the invention. Small modifications, equivalent substitutions and improvements made on the embodiment according to the technical substance of the invention shall be included in the scope of protection of the technical scheme of the invention.

What is claimed is:

1. An intelligent doghouse, comprising a cage bracket module, a host computer control device, an automatic excrement treating device, a feeding module, a disinfection and heat preservation device, an automatic door control module and a video/audio module which are arranged on the cage bracket module, wherein:

the host computer control device comprises a host computer control module which translates and executes various commands through a singlechip circuit;

the automatic excrement treating device comprises a defecation guiding module for attracting a pet to defecate at a fixed position, a stirring module for receiving water and excrement and smashing the excrement, an excrement flushing module for flushing the excrement and injecting water into the stirring module, a water level and weight measuring module for supplying measuring information to the control of water intake and drainage actions and the stirring action of the stirring module, a sewage discharge mechanism for discharging sewage treated by the stirring module, and a central control module for receiving the information of the water level and weight measuring module and controlling the actions of a stirring motor and the sewage discharge mechanism;

the feeding module is provided with a feeding program stored in the host computer module and used for automatically feeding food, snacks or drinking water under remote control;

the disinfection and heat preservation device is provided with a refrigerating module capable of controlling the temperature of the doghouse in an appropriate state, a heating module capable of supplying hot air for drying the dog after bath and a disinfection module used for disinfecting and deodorizing the dog cage;

the automatic door control module controls the opening and closing of a pet door in an electromagnetic way;

the video/audio module comprises an infrared camera capable of shooting the pet, a broadband microphone and a loudspeaker;

the automatic excrement treating device, the feeding device, the disinfection and heat preservation device and the automatic door control module are connected with the host computer control module; the host computer control module can be connected with value-added service background equipment for automatic control and can automatically control daily operation of each device locally; a user can remotely access the value-added service background equipment so as to control each terminal device through the host computer control module;

wherein the automatic excrement treating device also comprises an anti-leakage module which is used for preventing sewage from overflowing from the stirring module and is arranged on the stirring module; the defecation guiding module consists of an annular defecation guiding apparatus and a defecation guiding liquid tank; the defecation guiding apparatus transfers defecation guiding liquid stored in the defecation guiding liquid tank to the defecation guiding apparatus through a defecation guiding apparatus cotton core and disperses the defecation guiding liquid into the air; and the defecation guiding apparatus is arranged between a bearing panel and an excrement flushing funnel.

2. The intelligent doghouse provided by claim 1, wherein the feeding module comprises a feeding container and a feeding bowl; a container liner with an upper food leakage hole at the bottom is arranged in the feeding container; the feeding bowl is connected to a lower food leakage hole formed at the bottom of the feeding container through a pipeline; a food conveyer driven by a stepper motor is arranged between the upper and lower food leakage holes and conveys food from the upper food leakage hole to the lower food leakage hole till the feeding bowl; and the rotation angle of the stepper is controlled by the host computer control module.

3. The intelligent doghouse provided by claim 1, wherein the snack feeding module comprises a snack feeding container and a snack feeding bowl; a snack liner with an upper snack leakage hole at the bottom end is arranged in the snack feeding container; the snack feeding bowl is connected to a lower snack leakage hole formed at the bottom of the snack feeding container through a pipeline; a snack conveyer driven by a snack stepper motor is arranged between the upper and lower snack leakage holes and conveys snacks from the upper snack leakage hole to the lower snack leakage hole till the snack feeding bowl; and the rotation angle of the stepper is controlled by the host computer control module.

4. The intelligent doghouse provided by claim 1, wherein the water feeding module comprises a water feeding container and a water feeding bowl; a water receiving liner with an upper water leakage hole at the bottom end is arranged in the water feeding container; the water feeding bowl is connected to a lower water leakage hole formed at the bottom of the water feeding container through a pipeline; and an electric water valve is arranged between the upper and lower water leakage holes.

5. The intelligent doghouse provided by claim 1, wherein the heating module of the automatic excrement treating device comprises a built-in heating rod and a blast mechanism; the disinfection module comprises a built-in disinfection pipe; the heating and disinfection modules are provided with air inlets and air outlets; and air blasted by a blast blower is blown towards the doghouse through the heating and disinfection modules.

6. The intelligent doghouse provided by claim 1, wherein the stirring module of the automatic excrement treating device comprises a stirring bucket and a stirring motor; the stirring bucket is used for receiving water and excrement; a duckbill which receives excrement and makes the excrement fall into the stirring bucket projects from the open end of the stirring bucket; and the stirring motor is provided with a stirring blade for smashing excrement and is fixedly clamped at the upper open end of the stirring bucket.

7. The intelligent doghouse provided by claim 6, wherein the water level detection module of the automatic excrement treating device is arranged an inner baffle wall of the stirring bucket, acquires water level information to control water intake and drainage actions and comprises a preserved water contact for ensuring that water is preserved in the stirring bucket; a gravity detection module comprises a gravity sensor which is connected with the stirring bucket through a pair of handles symmetrically arranged on the outer wall of the stirring bucket; and a damping spring is arranged at the joint between the handle and the sensor.

8. The intelligent doghouse provided by claim 7, wherein the sewage discharge mechanism of the automatic excrement treating device is arranged at the bucket bottom of the stirring bucket and is related with a drainage cover at the bucket bottom; the mechanism comprises a drainage cover jacking device, a sewage drain pipe and a flushing water pipe; an anti-reflux one-way valve is arranged between the sewage drain pipe and the flushing water pipe; and the flushing water pipe is controllably related with the water level detection module.

9. The intelligent doghouse provided by anyone of the preceding claims, wherein remotely-controllable lamplight illuminating devices are arranged inside and at the bottom of the cage bracket module.

\* \* \* \* \*